April 20, 1965 R. H. WISE 3,178,752
WINDSHIELD WIPER BLADES
Filed March 6, 1963 2 Sheets-Sheet 1
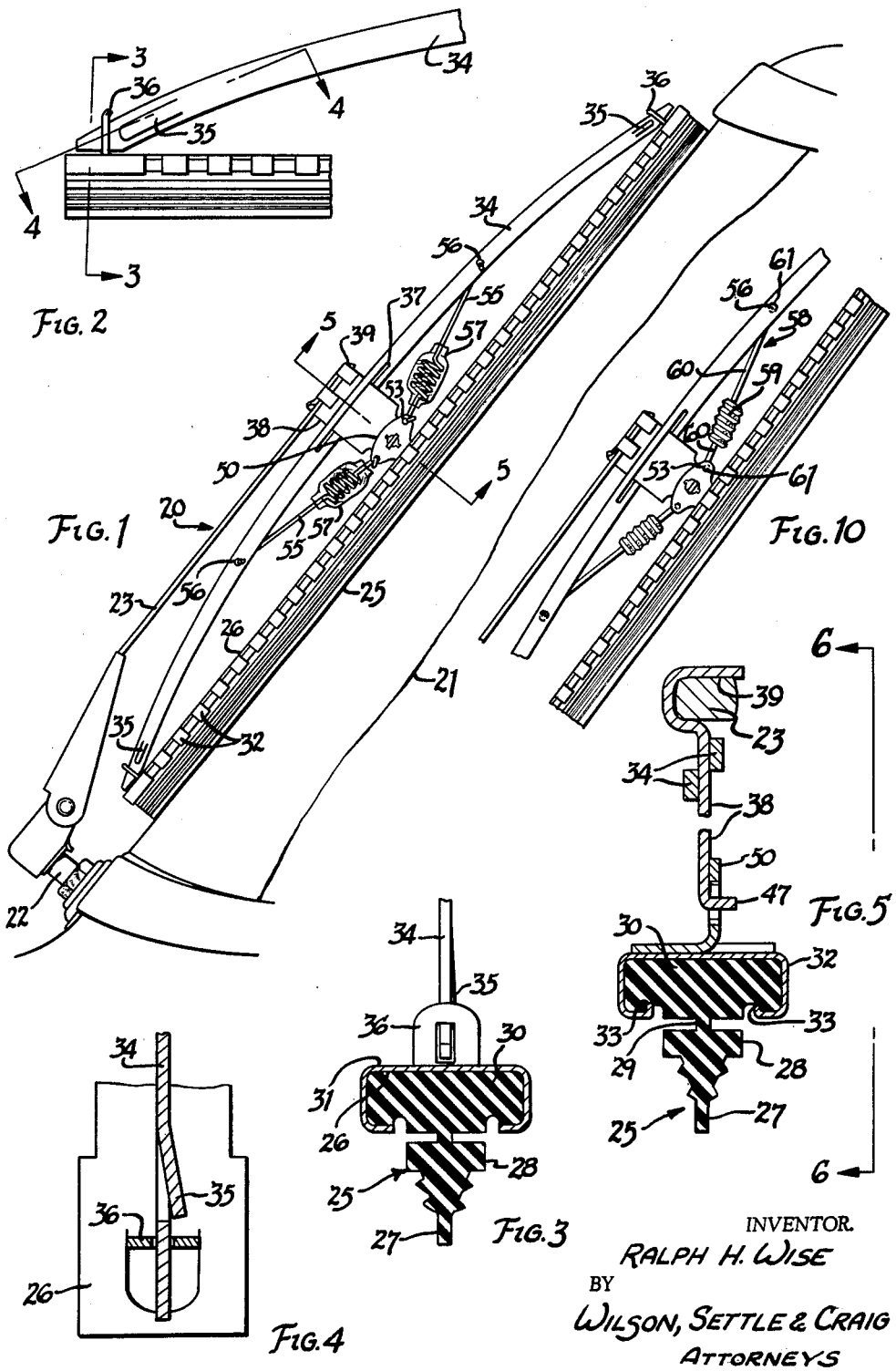
INVENTOR.
RALPH H. WISE
BY
WILSON, SETTLE & CRAIG
ATTORNEYS April 20, 1965 R. H. WISE 3,178,752
WINDSHIELD WIPER BLADES
Filed March 6, 1963 2 Sheets-Sheet 2

INVENTOR.
RALPH H. WISE
BY
WILSON, SETTLE & CRAIG
ATTORNEYS

United States Patent Office

3,178,752
Patented Apr. 20, 1965

3,178,752
WINDSHIELD WIPER BLADES
Ralph H. Wise, P.O. Box 356, Grand Haven, Mich.
Filed Mar. 6, 1963, Ser. No. 263,205
5 Claims. (Cl. 15—250.42)

The present invention relates to windshield wiper blades and more particularly to a windshield wiper blade adapted to conform to a curved windshield surface under a load applied directly to the wiping element, at a point intermediate the ends of the element and with separate means being provided to load the ends of the wiping element to contact with the windshield.

In conventional wiper blades for curved windshields, an oscillatable wiper arm applies a load to a plurality of pivotally connected yokes that in turn transmit the load to the windshield. The load of the arm is first applied to a primary yoke and is then subdivided into partial loads which are exerted through secondary yokes to spaced points along the length of the wiping element. The wiping element is thus forced against the wiping surface at a plurality of separate points.

The windshield wiper blade of the present invention constitutes an improved departure from the conventional constructions in that the load of the oscillatable wiper arm is applied directly and entirely to the wiper element and this at a point intermediate the ends of the wiper element.

Then, separate means are provided to develop a force or forces that are applied from the center of the wiping element to the extreme ends of the wiper element to lay the element into conforming wiping contact with the windshield surface and evenly over sharply changing contour portions thereof.

In one embodiment of the invention, this secondary and separate force means comprises a single structural member spanning the length of the blade; and this structural member or bridge is loaded by at least one tensile member to urge the ends of the member and the blade into contact with the windshield surface.

The ends of the wiping element are floatingly connected to the structural bridge member and thus the wiping element or blade floats to more readily conform to the changing windshield surface contour.

A hinged bearing surface intermediate the ends of the wiping element serves as the point of force application, and it is from this bearing element that separate force is developed and transmitted by tension springs through a bridge element to urge the end points of the wiping element into contact with the surface of the windshield.

The bearing surface is so designed that the wiping element and the structural backing element can orient themselves or float relative to the changing curvature of the windshield surface being wiped. The wiping element can thus conform to the variable curvature windshield surface with the tension springs assuming relative positions necessary to accommodate such conformation, while continuously exerting force to the bridging backing element, urging the bridging member toward the windshield. Additionally, the bearing surface at the point of force application supports the entire wiping element for floating movement relative to the arm so that the "rise and fall" of the blade assembly and associated parts during the oscillation of the wiper arm causes or permits the blade to conform and maintain wiping element contact with the windshield surface being wiped.

It is therefore an important object of the present invention to provide a novel windshield wiper assembly embodying primary and secondary force application systems to urge the wiper blade into contact with a windshield surface to be wiped.

A further object is to provide an improved windshield wiper blade assembly in which the wiper arm load is applied directly to a bearing surface intermediate the ends of the wiping element, with separate load transmittal to the ends of the wiping element through tension means applying loading to a rigid backing element.

Another important object of the invention is to provide a windshield wiper assembly including a wiping blade, a rigid structural member slidably interconnecting the end extremities of the wiping element, a bearing element on the wiping blade to receive force from an oscillatable wiper arm; and separate means for force generation to urge the ends of the blade into contact with the windshield; and wherein the blade can float for improved conformity to the windshield during the wiping action.

Yet another object of the present invention is to provide a windshield wiper blade assembly wherein the blade readily conforms to a curved windshield surface and including a centrally located pivotal bearing point to which the load of an oscillatable wiper arm is applied and which facilitates attachment of the blade.

Other objects of this invention will appear in the following description and appended claims, reference being had to the accompanying drawings forming a part of this specification wherein like reference characters designate corresponding parts in the several views.

In the drawings:

FIGURE 1 is a side elevational view of a windshield wiper blade assembly of the present invention as utilized in conjunction with a wiper arm and a windshield;

FIGURE 2 is an enlarged fragmentary elevational view similar to FIGURE 1, illustrating one end of the wiper blade assembly;

FIGURE 3 is an end elevational view taken along the line 3—3 of FIGURE 2;

FIGURE 4 is an enlarged sectional view taken along the line 4—4 of FIGURE 2, looking in the direction of the arrow;

FIGURE 5 is an enlarged sectional view taken along the line 5—5 of FIGURE 1;

FIGURE 10 is a fragmentary side elevation of a modified form of the invention.

Figure 6:
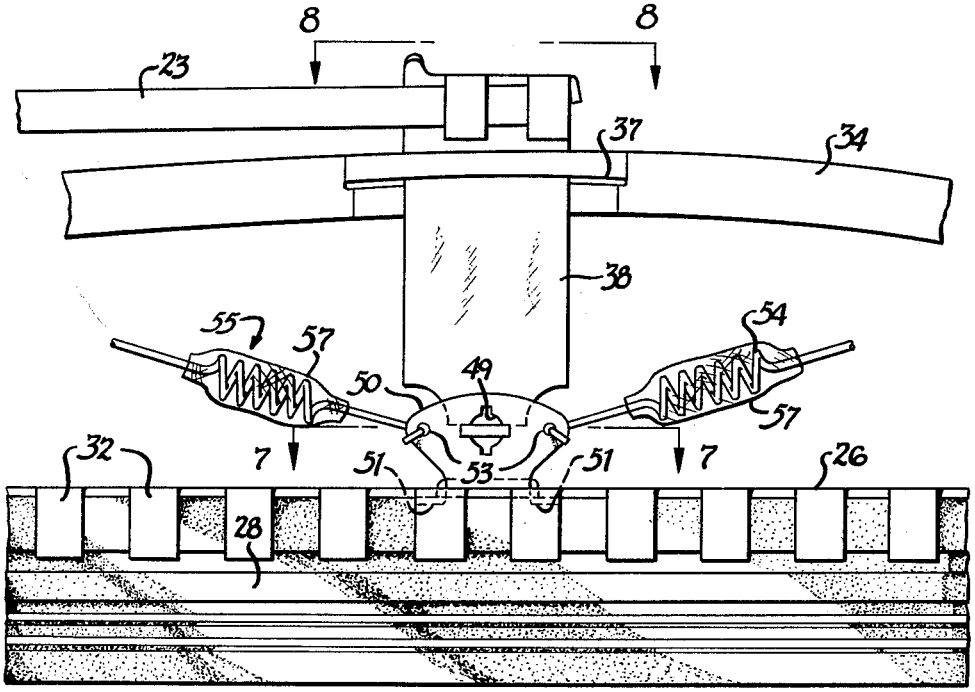
FIGURE 6 is an enlarged fragmentary center elevation view taken along the line 6—6 of FIGURE 5.

Before explaining the present invention in detail, it is to be understood that the invention is not limited in its application to the details of construction and arrangement of parts illustrated in the accompanying drawings, since the invention is capable of other embodiments and being practiced or carried out in various ways. Also, it is to be understood that the phraseology or terminology employed herein is for the purpose of description and not of limitation.

As shown on the drawings:

In FIGURE 1, the reference numeral 20 refers generally to a windshield wiper assembly of the present invention. This assembly is utilized in conjunction with a windshield surface 21. At the lower cowl section of the windshield surface 21 is a pivot shaft 22, driven by a motor, not shown, and serving to oscillate the windshield wiper arm 23 across the windshield surface.

The wiper assembly 20 includes an elastomeric wiping blade element 25 having secured thereto a carrier element 26 best illustrated in FIGURES 1 and 3. The wiping element 25 has a lower, relatively thin wiping edge 27 joined through a thickened medial portion 28 and a relatively thin hinge section 29 to an upper retaining section 30 which is generally rectangular in cross-section.

The carrier element 26 is preferably formed of sheet metal, such as stainless steel, and comprises an upper plate portion 31 of substantially greater width than thickness. The plate portion 31 overlies the upper surface of the retaining portion 30 of the wiping element 25 and is provided with downturned and spaced fingers 32. The lower free ends of fingers 32 are crimped inwardly as shown at 33, to securely interlock the carrier element 26 and the wiping element 25. By virtue of the separated finger portions 32 and the relatively thin stock from which the carrier element 26 is made, the carrier element is relatively flexible in planes normal to the surface of the windshield surface 21 but is relatively inflexible in planes parallel to the windshield surface. Thus, the carrier element 26 is capable of stabilizing the wiping element 25 as it is moved across the surface 21, while at the same time accommodating conformation of the wiping edge 27 to the windshield surface in a manner to be hereafter more fully described.

*The primary force generation system*

As illustrated in FIGURES 1 through 6 of the drawings, a structural bridge element 34 is formed from flat bar stock to an overall arcuate configuration and has its ends lanced, as at 35, FIGURES 1, 2 and 4. The lances 35 cooperate with upstanding apertured ears 36 formed at the remote ends of backing element 26 to retain the wiper element in proper position. This simplified structure provides a slidable or floating interconnection between the bridge element 34 and the backing element 26. It will be understood that by depressing one lanced portion 35 of bridge element 34 and sliding that end of the bridge element through an ear 36, the other end of element 26 can be inserted; then with slight reverse movement, the unit snaps into position. Removal is the reverse operation.

Figure 8:
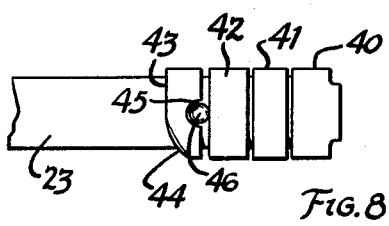
FIGURE 8 is an enlarged fragmentary plan view taken in direction of arrows 8—8 of FIGURE 6.
Figure 9:
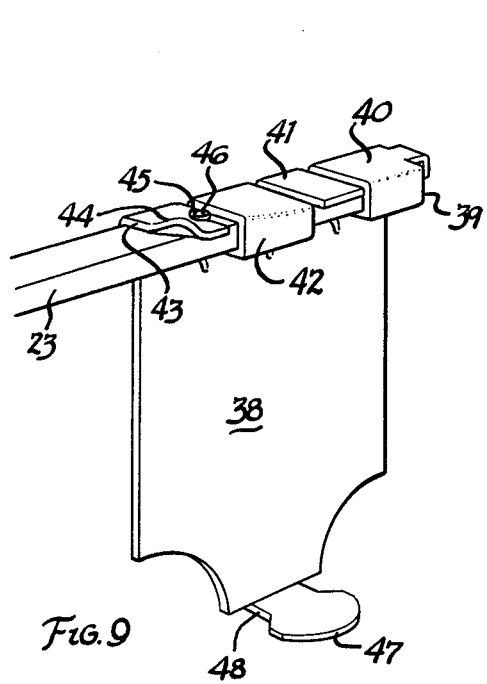
FIGURE 9 is a fragmentary perspective illustration of the blade and arm attachment structure as shown in FIGURES 1, 5 and 6.

From FIGURES 1, 5 and 6, it will be noted that the medial portion of the structural or bridge member 34 is provided with a slot 37 through which a connector element 38 is inserted. This provides stability in planes normal to the windshield. This connector element 38 is preferably formed from sheet metal and includes an upper receiving portion 39 for the end of wiper arm 23. Portion 39 is of generally rectangular configuration and includes adjacent and opposing U-shaped flanges 40, 41, 42 and 43 as shown in FIGURES 8, 9. It will be noted that flange 43 has one corner edge 44 turned. Also a notch 45 is provided to receive an upstanding boss 46 formed on arm 23. It will be understood that flange 45 will spring up to admit the boss 46 as the end of arm 23 is pushed beneath upturned corner portion 44. It will also be understood that when an upward pressure is placed on the portion 44, this will lift flange 43 to disengage boss 46 and arm 23 from the connector 38 to permit removal of the blade assembly 20.

Figure 7:
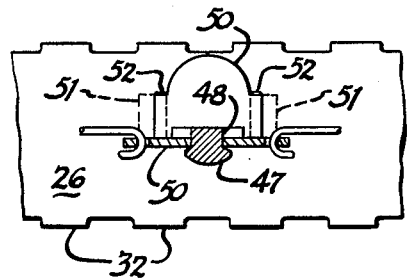
FIGURE 7 is an enlarged fragmentary sectional view taken along the line 7—7 of FIGURE 6.

Connector element 38 is provided at the bottom with a flange 47 as shown in FIGURES 5 and 9. Flange 47 is provided with a reduced neck portion 48. This portion 48 acts as a pivot bearing for circular slot 49 formed in bearing plate element 50, as illustrated in FIGURES 5, 6 and 7.

As best illustrated in FIGURES 1, 5, 6 and 7, the upstanding bearing element 50 is provided intermediate the ends of element 26 to receive the full downward force of the arm 23. This bearing element 50 is suitably formed from sheet metal and includes the bearing slot 49 through which the neck 48 of arm connector 38 is assembled by inserting flange end 47 therein. The bearing element 50 is additionally provided with tabs 51 for secure assembly to carrier element 26 through slots 52 provided therein.

It will be understood that with tap portion 47 of the connector 38 engaged in slot 49 of the bearing element 50, a pivot bearing is provided to permit the wiping portion 25 of the assembly 20 to assume an infinite number of positions relative to the glass surface 21, thus forcing the wiper element to remain in positive wiping contact with the windshield regardless of the contour of the windshield.

From the foregoing, it will be understood that all pressure from the arm 23 is transmitted directly to the central portion of the wiper element assembly 26, 25.

*Secondary force generation system*

Element 50 is provided with holes 53 to receive the inner ends of tension spring members 55. Also, the bridge element 34 is provided with holes at 56. These holes 56 receive the other ends of the tension spring members 55. Since element 50 is fixed to carrier 26 and bridge member 34 is rigid, it will be understood that a force is developed by the tension members 55, tending to raise element 50 and push element 38 upwardly through a slot 37 of bridge 34. However, arm 23 biases elements 38 and 50 and 26 into contact with the windshield surface 21. The effect therefore is that the ends of the bridge 34 are pulled down against the windshield surface to press the extreme ends of the blade 25 against the surface 21. This provides a beautifully uniform wiping pressure all along the length of the wiping edge 27 and in addition provides a flexible and hand-like wiping conformance of the edge 27 all along the length against the surface 21.

*Operation*

The operation of the wiper assembly of the invention in wiping a curved glass windshield is as follows: The oscillating wiper arm 23 generates a force biasing the unit toward the glass surface 21. This force is applied by arm 23 through element 38 to element 50. Thus, the entire arm force is applied directly to the central area of the flexible wiper element 26.

Then a secondary force system comes into play. Thus tension members 55 are connected between element 50 and bridge element 34.

Then tension members 55 generate a force upon the remote ends of bridge element 34 which is in turn applied to the remote ends of the flexible support element 26. This will move the remote ends of flexible wiper support element 26 toward the glass, in planes normal to the windshield and independent of other applied forces.

The rigid floating bridge element 34 will guide the wiper element 26 while holding it in planes normal to the glass and preventing contact between wiper support element 26 and the glass 21. This then provides uniform pressure along wiping edge 27.

It will be understood that as the blade traverses the arc of the wipe on the glass, the pressure from arm 23 is constantly applied to the central area of the wiping support element 26 while the remote ends of wiper support element 26 are pressurized into conforming to the glass curvature, due to the forces generated by the yielding tension members 55.

*Extended scope of invention*

Tension members.—In FIGURE 1, the tension members 55 can be covered by an opaque plastic sheet, designated 57. This has a dual function of enhancing the appearance of the unit by covering the coils 54 of the elements 55. This prevents the coils from becoming clogged with ice and snow in inclement weather.

In order to support the broad terminology "tension members" in this specification in the claims dependent hereto, there is provided an illustration of an alternate form of a tension member in FIGURE 10. Thus, as there shown, the members are fabricated of rubber or similar elastomeric material, characterized by elastic memory, analogous to a spring. These are designated 58 and comprise a bellows shaped body portion 59. From each end of the body portion 59 extends a rod-like connecting member 60 with a connecting button 61 formed at each end. The buttons 61 are inserted through the holes 53 and 56 in the manner of the units 55 in FIGURE 1.

As a further extension of the invention, it is to be pointed out that tension members 55 or 58 or other form are adaptable as to their relative strength. Thus, they may be of equal or different strengths. For example, because of the curvature of a windshield surface, it may be desirable or necessary to have a relatively greater force either at the bottom or top to properly conform the wiping blade to a relatively more sharply upper or lower changing contour. Thus, within the extended scope of invention, the tensile elements can be of the same or differing strengths.

Having thus described my invention, I now claim:

1. In a wiper for a windshield surface, and for use with a wiper arm oscillatable over the windshield surface, and the wiper arm including means biasing said arm toward the windshield surface, an elongated carrier supporting an elongated, elastomeric wiping element to traverse the windshield surface, said carrier being flexible in planes normal to the windshield surface and relatively inflexible in planes parallel to the windshield surface, a superstructure for connecting said carrier element with the wiper arm, comprising a rigid bridge element having spaced ends, means connecting the ends of said bridge element to said carrier element for limited, relative, slidable movement, a tension element having one end connected to said bridge element and the other end connected to said carrier element, bearing means connecting the wiper arm and said carrier element, and said bearing means accommodating pivotal movement of said elongated carrier in planes normal to the windshield surface and retaining said bridge element above said windshield surface.

2. In a wiper for a windshield, and for use with a wiper arm oscillatable over the windshield and biased toward the windshield, an elongated carrier supporting an elongated elastomeric wiping element to traverse the windshield, bearing means for pivotally connecting the wiper arm and a central portion of said elongated carrier and transferring the force of the arm directly to the central portion of said wiping element, an elongated, rigid bridge member having spaced ends, means slidably interconnecting said ends of said bridge member to said carrier on each side of said bearing means, tension means connected between said bearing means and relatively outer portions of said bridge member, and means retaining said bridge member in slidable contact with said bearing means.

3. In a wiper for a surface, an elongated, rigid bridge member having spaced ends, an elongated, elastomeric wiping blade, an elongated carrier for said blade and conformable to the contour of the surface, means slidably interconnecting said ends of said bridge member to said carrier, bearing means connected to said carrier intermediate the connections between said bridge member and carrier, for pivotal movement longitudinally of said carrier, and means connected between said carrier and said bridge member urging said bridge member toward said carrier.

4. The invention of claim 3 including a slidable interconnection between said bearing means and said bridge member.

5. In a wiper for a surface and for use with an arm oscillatable over the surface and the arm being biased toward the surface, an elongated, elastomeric wiping blade to traverse the surface in wiping contact therewith along its length, elongated carrier means for said blade conformable to the contour of the surface, rigid bridge means having spaced ends, means slidably interconnecting said spaced ends of said bridge means to said carrier at spaced points thereon, connecting means operably connecting said arm to said carrier between said spaced ends of said bridge means, means supporting said bridge means out of contact with the surface, and means resiliently urging said bridge means and said carrier toward one another.

References Cited by the Examiner

UNITED STATES PATENTS 2,780,824  2/57  Scinta et al. _____ 15—250.42
2,996,746  8/61  Vickerson _____ 15—250.42

CHARLES A. WILLMUTH, *Primary Examiner.*